United States Patent
Saettone et al.

(10) Patent No.: US 11,636,986 B2
(45) Date of Patent: Apr. 25, 2023

(54) FLEXIBLE, BIODEGRADABLE AND BIOCOMPATIBLE SUPERCONDENSER

(71) Applicant: BIO-ON S.P.A., San Giorgio Di Piano (IT)

(72) Inventors: Paolo Saettone, San Giorgio Di Piano (IT); Mario Cifelli, San Giorgio Di Piano (IT); Lorenzo Migliorini, Milan (IT); Gianluca Generali, San Giorgio Di Piano (IT); Tommaso Santaniello, Milan (IT); Ilaria Monaco, San Giorgio Di Piano (IT); Paolo Milani, Milan (IT); Mauro Comes Franchini, San Giorgio Di Piano (IT)

(73) Assignee: BIO-ON S.P.A., San Giorgio di Piano (IT)

( * ) Notice: Subject to any disclaimer, the term of this patent is extended or adjusted under 35 U.S.C. 154(b) by 22 days.

(21) Appl. No.: 17/297,195

(22) PCT Filed: Nov. 28, 2018

(86) PCT No.: PCT/IB2018/059391
§ 371 (c)(1),
(2) Date: May 26, 2021

(87) PCT Pub. No.: WO2020/109841
PCT Pub. Date: Jun. 4, 2020

(65) Prior Publication Data
US 2022/0028628 A1    Jan. 27, 2022

(51) Int. Cl.
*H01G 11/52*    (2013.01)
*H01G 11/62*    (2013.01)
*H01G 11/84*    (2013.01)

(52) U.S. Cl.
CPC ............ *H01G 11/52* (2013.01); *H01G 11/62* (2013.01); *H01G 11/84* (2013.01)

(58) Field of Classification Search
None
See application file for complete search history.

(56) References Cited

U.S. PATENT DOCUMENTS

| | | | |
|---|---|---|---|
| 9,346,948 B2 * | 5/2016 | Whitehouse | C08L 67/04 |
| 2009/0280308 A1 * | 11/2009 | Tsukuda | H01G 11/52 428/338 |
| 2014/0002957 A1 * | 1/2014 | Casasanta, III | H01G 11/62 29/25.03 |
| 2014/0362495 A1 * | 12/2014 | Brandon | H01G 11/52 361/502 |
| 2018/0043656 A1 * | 2/2018 | Song | B32B 5/18 |
| 2018/0315554 A1 * | 11/2018 | Noguchi | H01G 11/84 |
| 2022/0028628 A1 * | 1/2022 | Saettone | H01G 11/52 |

FOREIGN PATENT DOCUMENTS

| | | | | |
|---|---|---|---|---|
| CN | 105304353 A | 3/2018 | | |
| WO | WO-2016036607 A1 * | 3/2016 | | B33Y 80/00 |
| WO | 2017149044 A1 | 9/2017 | | |
| WO | WO-2020109841 A1 * | 6/2020 | | H01G 11/52 |

OTHER PUBLICATIONS

International Search Report dated Aug. 1, 2019 re: Application No. PCT/IB2018/059391, pp. 1-4, citing: U.S. 2018/043656 A1, U.S. 2009/280308 A1, CN 105 304 353 B, U.S. 2014/002957 A1, U.S. 2018/315554 A1, WO 2017/149044 A1 and U.S. 9 346 948 B2.
Written Opinion dated Aug. 1, 2019 re: Application No. PCT/IB2018/059391, pp. 1-5, citing: U.S. 2018/043656 A1, U.S. 2009/280308 A1, CN 105 304 353 B, U.S. 2014/002957 A1, U.S. 2018/315554 A1, WO 2017/149044 A1 and U.S. 9 346 948 B2.

* cited by examiner

*Primary Examiner* — Dion R. Ferguson
(74) *Attorney, Agent, or Firm* — Cantor Colburn LLP

(57) ABSTRACT

A supercondenser includes at least two electrodes separated by at least one separator having a polyhydroxyalkanoate (PHA) and at least one electrolyte, and relative production process. The supercondenser is flexible, biodegradable, and biocompatible, and can be made with reduced manufacturing costs and can be integrated, for example, in electronic devices that must be used inside biological organisms.

19 Claims, No Drawings

FLEXIBLE, BIODEGRADABLE AND BIOCOMPATIBLE SUPERCONDENSER

TECHNICAL FIELD

The present disclosure relates to a supercondenser. In particular, the present disclosure relates to a supercondenser comprising at least two electrodes separated by a separator comprising a polyhydroxyalkanoate (PHA) and an electrolyte.

BACKGROUND

It is known that the term "supercondenser" refers to an electrochemical condenser whose capacity to store a high content of electric charge is much higher (about 10 to 100 times) than that of a traditional condenser, even if it allows a lower operating voltage and has some disadvantages in the application with high frequency.

From the point of view of energy storage capacity, supercondensers are halfway between traditional electrolytic condensers and rechargeable electric charge accumulators (or batteries). Compared to the latter, supercondensers have much higher peak currents, lower production costs, no risk of overloading and do not contain corrosive and potentially toxic electrolytes.

Like traditional condensers, supercondensers are used in all areas of electrical engineering and electronics where there is a need to charge/discharge a large amount of energy in short time, as for example in engine starting systems in the automotive field, in voltage stabilizers in the photovoltaic field, in uninterruptible power supplies, in photographic flashes, in LED systems for street lighting, in static RAMs such as capacitive memories or in defibrillators in the medical field.

Supercondensers substantially comprise at least two electrodes, a separator, an electrolyte (liquid or solid) and an insulator. The two electrodes are separated by the separator, which is a membrane permeable to electrolyte ions, while the insulator is placed outside one of the two electrodes. When the electrodes are polarized, the electrolyte ions migrate, passing through the separator towards the opposite charge electrode. This allows the formation of a pair of capacitive double layers.

Since the capacity of the condenser (i.e. the constant ratio between the charge, Q, which accumulates on the electrodes and the potential difference, ΔV, between them) is directly proportional to the exchange surface area of electrodes, for the purpose of forming a double layer having the maximum number of electrolytic ions, electro-chemically inert materials with a high specific surface area and the appropriate geometry are preferably used as electrodes. Among the materials with these characteristics, the most interesting are carbon and certain metal oxides.

The electrolyte can be of the solid type or in an organic or aqueous solution. Organic electrolytes are usually obtained by dissolving quaternary salts in organic solvents and their dissociation voltage can be higher than 2.5 V. Typical aqueous electrolytes are KOH, $H_2SO_4$, which have a dissociation voltage of about 1.2 V. Regardless of the type of electrolyte selected, it must have high conductance and adequate electrochemical stability in order to allow the supercondenser to operate at the highest possible voltage. Currently, the tetraethylammonium tetrafluoroborate (TEATFB) in acetonitrile ($CH_3CN$) system is indicated as the best organic electrolyte for use in supercondensers. This system makes it possible to reach electrical conductance values up to 60 mS/cm. However, the high toxicity of acetonitrile is a disadvantage for the use of this electrolyte. Recently discovered are the so-called "ionic liquid" electrolytes, characterized by the absence of corrosivity, typical conductance of 8 mS/cm (up to 60 mS/cm if dissolved in acetonitrile), operating temperature up to 150° C.

The purpose of the separator is to allow the electrolyte ions to pass through, at the same time preventing the passage of an excessive quantity of electric current from one electrode to another (thus avoiding short-circuiting the supercondenser). In the case of use of organic electrolytes, usually the separators are of the polymeric type (typically polypropylene) or cellulose fibres (typically paper); instead, in the case of aqueous electrolytes, the choice is between ceramic or glass fiber separators.

Supercondensers are subdivided into two main sub-categories: double-layer condensers and pseudo-condensers. There are also supercondensers that possess the characteristics of both subclasses and are called hybrid condensers.

Among these, double-layer condensers are those with a simpler structure. They exploit the accumulation of electrostatic charges generated thanks to the so-called "Helmholtz double-layer effect". This effect is based on the principle that when the electrode comes into contact with the electrolyte, solid or liquid, a dielectric interface is formed having a nanometric or picometric thickness and a consequent accumulation of free charge at both ends of this interface.

Instead, pseudo-condensers exploit a different principle that involves the use of a metal electrode that induces a further accumulation of charge, thanks to the charge-transfer effect (Marcus's theory), following the development of reversible oxide-reduction reactions at the interface.

Hybrid condensers envisage, instead, the exploitation of both principles, both those exploited by double-layer condensers and those exploited by pseudo-condensers.

From the performance point of view, in addition to the ability to accumulate charges, supercondensers are distinguished according to the energy they can store/deliver (Wh/Kg) and the power they can absorb/deliver (W/Kg) over time (the unit of measurement of weight, Kg, refers to the mass of the electrodes used to form the interface with the electrolyte).

Supercondensers should not be considered as an alternative to electric charge accumulators (or batteries) for the long-term storage of electric energy. Supercondensers become the ideal solution when high electrical power is required for short periods of time. By combining slow-release electric energy systems (batteries) with supercondensers, it is possible to create hybrid systems able to satisfy both energy needs.

Initially, supercondensers demonstrated their utility in designing high-speed trains. In fact, thanks to their ability to quickly charge, in trains they are able to recover large amounts of energy during braking and then supply it during the acceleration phases.

Supercondensers also find application in the design of buildings. In Japan, they are in fact installed on the roofs of buildings to improve energy efficiency during peak electricity usage hours.

Recently, supercondensers have been included in hybrid electric vehicles, for example in rapid supply systems or in energy recovery systems during braking.

In the field of consumer electronics, supercondensers are often added as buffer elements for the protection of internal computer memories, as internal energy sources for backup activities, inside uninterruptible power supplies for the temporary maintenance of power supply in the absence of external power supply.

Supercondensers have therefore proved to be of great versatility, being useful in different fields of application.

However, the supercondensers currently on the market have the disadvantage of being made of non-flexible and non-biocompatible or biodegradable materials. This aspect limits the possibilities of using supercondensers, excluding the biological and eco-sustainable applications.

SUMMARY

The Applicant has therefore posed the problem of developing a flexible, biodegradable and biocompatible supercondenser with reduced manufacturing costs and which can be integrated, in particular, into electronic devices that must be used within biological organisms.

To date there are electric current sources that, integrated with supercondensers, allow charge accumulation. However, these devices are difficult to exploit in the bio-medical field because of their intrinsic rigidity and the incompatibility of the materials with which they are made and biological tissues. To be used effectively in the bio-medical field, an electronic device must in fact be biocompatible and flexible.

The Applicant has now found that this problem, and others which will be better illustrated hereinafter, can be solved by a supercondenser comprising at least two electrodes separated by a separator comprising a polyhydroxyalkanoate (PHA) and an electrolyte.

DETAILED DESCRIPTION OF THE DISCLOSURE

In a first aspect, the present disclosure therefore relates to a supercondenser comprising at least two electrodes separated by at least one separator comprising a polyhydroxyalkanoate (PHA) and an electrolyte.

Preferably said at least two electrodes comprise a conductive material, preferably selected from: gold, silver, aluminium, carbon fibres, activated carbon fibres, activated carbon, carbon gel, mesocarbon, graphene, carbon nanotubes, carbon black. Alternatively, the conductive material can be selected from conductive polymers, in particular: polyaniline (PANI), polypyrrole (PPY), poly(p-phenylenevinylylene) (PPV), poly(3,4-ethylenedioxythiophene) (PEDOT) or, in general, with other polythiophene derivatives.

The aforementioned electrodes preferably have a thickness comprised between 100 nm and 500 nm, more preferably between 150 nm and 300 nm.

Preferably, each electrode is flexible.

As is known, PHAs are polymers produced by microorganisms isolated from natural environments or even by genetically modified micro-organisms, and are characterized by a high biodegradability.

Preferably, the PHA is a polymer containing repeating units of formula (I):

—O—CHR$_1$—(CH$_2$)$_n$—CO— (I)

where:
R$_1$ is selected from: C$_1$-C$_{12}$ alkyls, C$_4$-C$_{16}$cycloalkyls, C$_2$-C$_{12}$ alkenyls, optionally substituted with at least one group selected from: halogen (F, Cl, Br), —CN, —OH, —OOH, —OR, —COOR (R=C$_1$-C$_4$ alkyl, benzyl);
n is zero or an integer from 1 to 6, preferably is 1 or 2.

Preferably, R$_1$ is methyl or ethyl, and n is 1 or 2.

The PHAs can either be homopolymers, copolymers or terpolymers. In the case of copolymers or terpolymers, they can be constituted of different repetitive units of formula (I), or of at least one repetitive unit of formula (I) in combination with at least one repetitive unit deriving from comonomers that are able to copolymerize with hydroxyalkanoates, for example lactones or lactams. In the latter case, the repeating units of formula (I) are present in an amount equal to at least 10% in moles with respect to the total moles of repetitive units.

Particularly preferred repeating units of formula (I) are those deriving from: 3-hydroxybutyrate, 3-hydroxyvalerate, 3-hydroxyhexanoate, 3-hydroxyoctanoate, 3-hydroxyundec-10-enoate, 4-hydroxyvalerate.

Particularly preferred PHAs are: polyhydroxybutyrate (PHB), poly-3-hydroxyvalerate (PHV), poly-3-hydroxyhexanoate (PHH), poly-3-hydroxyoctanoate (PHO), poly(3-hydroxybutyrate-co-3-hydroxyvalerate) (PHBV), poly(3-hydroxybutyrate-co-3-hydroxyhexanoate) (PHBH), poly(3-hydroxybutyrate-co-4-hydroxybutyrate), poly(3-hydroxyoctanoate-co-3-hydroxyundecen-10-enoate) (PHOU), poly(3-hydroxybutyrate-co-3-hydroxyvalerateco-4-hydroxyvalerate) (PHBVV), polyhydroxybutyrate-hydroxyvalerate copolymer, or mixtures thereof.

According to the purposes of the present disclosure, a particularly preferred PHA is polyhydroxybutyrate (PHB).

Preferably, the separator comprises from 10% to 90% by weight, more preferably from 30% to 80% by weight, of PHA, and from 10% to 90% by weight, more preferably from 20% to 70% by weight, of electrolyte, the percentages being expressed with respect to the weight of the separator.

Preferably, the separator according to the present disclosure is a membrane-shaped layer having a thickness comprised between 10 μm and 2000 μm.

Preferably, the separator is flexible.

According to the present disclosure, the at least one electrolyte is preferably an ionic liquid. Even more preferably said ionic liquid is selected from: natural amino acid derivatives, such as tetrabutylammonium L-proline (TBA L-Pro), choline bis(trifluoromethylsulfonyl)imide (choline (Tf2N)), tetraethylammonium L-proline (TEA L-Pro); natural derivatives of lignin, such as phosphoric acid of N-ethyl-N-(furan-2-yl-methyl)ethanamine ([FurEt2NH][H$_2$PO$_4$]), phosphoric acid of N-ethyl-N-(4-methoxybenzyl) ethanamine ([p-AnisEt2NH][H$_2$PO$_4$]), phosphoric acid of N-4-((diethylamine)methyl)-2-methoxyphenol ([VanEt2NH][H$_2$PO$_4$]); ionic liquids of synthetic origin, such as 1-butyl-3-methylimidazolium tetrafluoroborate (BMIM(BF4)), 1-butyl-3-methylimidazolium bis(trifluoromethylsulfonyl)imide (BMIM(Tf2N)), 1-ethyl-3-methylimidazolium bis(trifluoromethylsulfonyl)imide (EMIM (Tf2N)).

Since the supercondenser according to the present disclosure comprises electrodes and separator preferably endowed with the characteristic of being flexible, it results that the supercondenser itself also has the characteristic of being flexible.

This flexibility gives numerous application advantages. In fact, a flexible supercondenser can advantageously be used both in the traditional application fields (described above) of rigid supercondensers, and in those fields in which the use of a rigid supercondenser is precluded or would be penalizing. Sometimes, especially in the medical-biological field (for example in cardiac valves), the supercondenser must in fact be able to flex in order to facilitate any movement exerted by or on the surface on which the supercondenser rests.

The supercondenser according to the present disclosure also has the further advantage of being a biodegradable and biocompatible supercondenser. In fact, the electrodes, the separator and the electrolyte comprise biodegradable and biocompatible elements. Then, also this feature confers numerous application advantages, especially in the medical-biological field, where the need to use biodegradable and biocompatible supercondensers with biological material represents a constraint which sometimes limits the choice of the type of supercondenser to be used.

The supercondenser according to the present disclosure can in fact be advantageously used in the following fields of application.

(A) Energy collection systems. The supercondenser according to the present disclosure can be coupled to a piezoelectric membrane (not necessarily of PHA), to maintain the charge produced for a longer time and increase the output voltage of the system. These coupled systems can be used in the automotive field, for example to feed pressure and/or temperature sensors placed inside the tyres, or within the so-called wearable devices, as for example in heating systems integrated into clothing.

(B) Pacemaker devices. Also in this case the supercondenser according to the present disclosure can be coupled to a piezoelectric membrane, creating a system. Once the system is placed in contact with the heart, the supercondenser is charged following the stimulation of the piezoelectric membrane by the heartbeat. Subsequently, when an integrated sensor detects a condition of cardiac suffering such as the slowing of beats below a certain threshold, the supercondenser discharges the accumulated current by stimulating the beating of the heart muscle. This application can also be extended to blood vessels. In fact, by creating the supercondenser according to the present disclosure in a tubular form, wrapping the supercondenser around the blood vessel, it can accumulate energy from the contractions of the muscular walls of the vessel itself.

(C) Biocompatible and biodegradable RAM memories. RAM memories of computers are made up of thousands, if not millions, of capacitive elements that serve to contain the data bit to be stored. By replacing these elements with the supercondensers according to the present disclosure, it is possible to create so-called disposable computers.

According to an alternative embodiment of the supercondenser according to the present disclosure, the electrodes comprise a PHA, preferably PHB, and at least one conductive charge dispersed in the PHA. Preferably, said conductive charge is an organic conductive material, even more preferably selected from: polyaniline (PANI), polypyrrole (PPY), poly(p-phenylene-vinylene) (PPV), poly(3,4-ethylenedioxythiophene) (PEDOT), or in general with other polythiophene derivatives.

Preferably said organic conductive material is present in a concentration comprised between 1% and 25%. This concentration advantageously makes it possible to have a density in the conductance band of at least $10^{19}$ (cm$^{-3}$) and an electric conductivity higher than 0.1 S/cm.

In this embodiment, in consideration of the common PHA matrix of the layers and the high intrinsic porosity of the PHA, the coupling to the interface has a particularly high contact area, allowing the production of even more efficient supercondensers and with a complete biodegradability and biocompatibility.

A second aspect of the present disclosure relates to a process for the production of a supercondenser according to the above description, comprising the steps of:
  providing at least two electrodes;
  providing at least one separator comprising a polyhydroxyalkanoate (PHA) and an electrolyte;
  placing each electrode in contact with a corresponding surface of the separator.

Preferably, the step of providing at least one separator comprises a step wherein the PHA is combined with the electrolyte by means of solvent casting or electrospinning or electrospraying.

Preferably, the step wherein the PHA is combined with the electrolyte through solvent casting comprises the steps of:
  dissolving the PHA in a solvent, preferably selected from: HFIP, chloroform, N,N-dimethylformamide, dichloromethane, dichloroethane, aniline, acetic acid, even more preferably acetic acid;
  adding an electrolyte to the solution thus obtained, preferably an ionic liquid as described above,
  pouring the solution added with electrolyte into a mould and allowing it to stand until the solvent evaporates.

According to the present disclosure, said solution added with electrolyte preferably comprises the PHA in a concentration comprised between 3% and 20% by weight, the electrolyte in a concentration comprised between 1% and 20% by weight, the percentages being expressed with respect to the weight of the solution.

In the context of the present description and the attached claims, with "electrospinning" is intended a spinning method, known in the art, which exploits the interaction that is created between a polymeric solution and an external electric field. Electrospinning makes it possible to produce filaments with a very small diameter, generally of the order of tens or hundreds of microns, with high speed and accurate process control, a result that is hardly achievable with the common techniques of fibre production by means of extrusion spinning.

An electrospinning system mainly comprises a pump connected to a syringe containing the polymer solution, a spinneret connected to the syringe, a high voltage source and a collector. Thanks to the action of the pump, the polymer solution is pushed outside the syringe, towards the collector, passing through the spinneret with a constant and controllable flow. When a high potential difference (usually between 1 and 30 kV) is applied between the spinneret and the collector, a drop of polymer is generated at the tip of the spinneret. As the difference in potential increases, the drop is subjected to increasing repulsive forces between its surface charges and the electrostatic forces exerted by the external electric field, until the distortion of the drop itself with the formation of a cone commonly known as Taylor's cone. As soon as the electric field exceeds a critical value, specific for each polymeric solution, the electrostatic forces prevail over the surface tension, leading to the formation of a polymer wire or fibre.

When the step wherein the PHA is combined with the electrolyte is carried out by means of electrospinning, the following steps are comprised:
  preparing a spinning solution through the solubilization of the polyhydroxyalkanoate (PHA), preferably PHB, and of the at least one electrolyte, preferably an ionic liquid as described above, in a solvent;
  subjecting the spinning solution to an electrospinning process, thus obtaining PHA fibres;
  depositing the PHA fibres on a collector, so as to obtain a separator.

Preferably the PHA fibres obtained by means of electrospinning have a diameter comprised between 0.1 µm and 5 µm.

Preferably the solvent is selected from: HFIP, chloroform, N,N-dimethylformamide, dichloromethane, dichloroethane, aniline, acetic acid. Even more preferably, the solvent is acetic acid.

According to the present disclosure, said spinning solution preferably comprises the PHA in a concentration comprised between 4% and 10% by weight, the electrolyte in a concentration comprised between 1% and 25% by weight, the percentages being expressed with respect to the weight of the solution.

As described above, in the electrospinning processes the spinning solution is forced through the spinneret by a very intense electric field. In this way a continuous jet is obtained which is collected, in the form of fibres, on the collector. After the evaporation of the solvent, the fibres are ready for use.

However, by acting on the rheological (viscoelasticity) and electrical (conductivity) properties of the solution, instead of the formation of fibres, there may be a formation of drops (sprayed jet) which, after the evaporation of the solvent, give rise to particles. In this case, the process is called electrospraying.

Therefore, within the scope of the present description and the attached claims, with "electrospraying" is intended a production process similar to electrospinning wherein the solution, when processed, produces a sprayed jet and not a continuous jet of fibre.

In electrospraying, the interactions between the polymeric chains of PHA, the solvent and the electrolyte are not such as to allow the production of fibres, therefore a set of particles is deposited on the collector which gives rise to a membrane with the increase of the deposition. The membrane thus formed will be more compact and disordered than that obtained by electrospinning.

Therefore, when the step wherein the PHA is combined with the electrolyte is carried out by means of electrospraying, the following steps are included:
- preparing a spraying solution by means of solubilization of the polyhydroxyalkanoate (PHA), preferably PHB, and of the at least one electrolyte, preferably an ionic liquid as described above, in a solvent;
- subjecting the spinning solution to an electrospraying process, thus obtaining PHA particles;
- depositing the PHA particles on a collector, so as to obtain a separator.

Preferably the PHA particles obtained by electrospraying have an average diameter comprised between 0.1 µm and 5 µm.

Preferably, the separator obtained by electrospraying is a membrane-shaped separator.

Preferably the solvent is chosen from: HFIP, chloroform, dichloromethane, dichloroethane, aniline and acetic acid. Even more preferably it is acetic acid.

According to the present disclosure, said spraying solution preferably comprises PHA in a concentration comprised between 4% and 10% by weight, electrolyte in a concentration comprised between 1% and 25% by weight, the percentages being expressed with respect to the weight of the solution.

According to an alternative embodiment of the present disclosure, the separator is produced by electrospinning starting from a spinning solution comprising PHA, preferably PHB, and a solvent, preferably chosen from: HFIP, chloroform, dichloromethane, dichloroethane, aniline and acetic acid. Once the separator is obtained, this is preferably impregnated with the at least one electrolyte, preferably an ionic liquid as described above.

According to a further embodiment of the process according to the present disclosure, both the electrodes and the separator are obtained by electrospinning, starting from a solution comprising PHA and solvent, which is added with the electrolyte to obtain the separator, or with a conductive charge to obtain the electrodes. Preferably, the production process of the supercondenser is conducted seamlessly, i.e. by depositing in series an electrode (using the PHA solution containing the conductive charge), the separator (using the PHA solution containing the electrolyte) and the other electrode (again using the PHA solution containing the conductive charge). This process allows for the creation of supercondensers which are substantially totally made in PHA. Given the common PHA matrix of the layers and the high intrinsic porosity of the PHA membranes, the coupling to the interface between the layers (electrodes and separator) maximizes the area and allows the creation of high-performance supercondensers characterized by complete biodegradability and biocompatibility.

The following embodiment examples are provided for the sole purpose of illustrating the present disclosure and are not to be understood in a sense limiting the scope of protection defined by the attached claims.

Example 1: Production of Some Ionic Liquids a) Tetrabutylammonium L-proline (TBA L-Pro)

An aqueous solution was prepared by dissolving 43 mmol of L-proline in 50 mL of water. 43 mmol of tetrabutylammonium hydroxide (40% v/v solution in water) were added.

The resulting solution was heated to 60° C. for 2 hours. After the necessary time elapsed, the water was eliminated by evaporation under reduced pressure, maintaining the temperature at 80° C. Subsequently the residual compound was dissolved in acetonitrile ($CH_3CN$) and filtered to remove the excess amino acid. Anhydrous magnesium sulphate ($MgSO_4$) was added to the solution obtained, in order to eliminate any traces of water and finally the solution was dried to remove the acetonitrile by means of evaporation under reduced pressure.

b) Tetraethylammonium L-proline (TEA L-Pro)

An aqueous solution was prepared by dissolving 43 mmol of L-proline in 50 mL of water. 43 mmol of tetraethylammonium hydroxide (40% v/v solution in water) were added.

The resulting solution was heated to 60° C. for 2 hours. After the necessary time elapsed, the water was eliminated by means of evaporation under reduced pressure, maintaining the temperature at 80° C. Subsequently the residual compound was dissolved in acetonitrile ($CH_3CN$) and filtered to remove the excess amino acid. Anhydrous magnesium sulphate ($MgSO_4$) was added to the solution obtained in order to eliminate any traces of water and finally the solution was dried to remove the acetonitrile by means of evaporation under reduced pressure.

c) Phosphoric acid of N-ethyl-N-(furan-2-yl-methyl)ethanamine [$FurEt_2NH$][$H_2PO_4$]

The tertiary amine N-ethyl-N-(furan-2-yl-methyl)ethanamine was synthesized. For this purpose, a solution was prepared by dissolving 104 mmol of furfural in anhydrous dichloroethane (360 mL) at 0° C. in an inert atmosphere. 121 mmol of diethylamine were added, and the obtained solution was left under stirring for 15 minutes. After this period, 146 mmol of sodium triacetoxyborohydride were added in drops and the reaction mixture was allowed to warm up to room temperature, under agitation, overnight in an inert atmosphere. Subsequently, the reaction was stopped by adding an aqueous solution of hydrochloric acid 3 M, until the formation of a precipitate corresponding to the reaction product was obtained in the aqueous phase.

The acidic pH of the obtained suspension was made basic by adding potassium hydroxide 3 M. The reaction product was obtained, after extraction with ethyl acetate, anhydrification with sodium sulphate ($Na_2SO_4$) and evaporation of the solvent, in the form of oil with a dark colour, with a yield of 80%.

Once the tertiary amine N-ethyl-N-(furan-2-yl-methyl) ethanamine was obtained, a solution was prepared by dissolving 65 mmol of the latter in 33 mL of methanol. The solution was brought to 0° C. Subsequently, phosphoric acid was added ($H_3PO_4$, 65 mmol) drop by drop. The obtained reaction mixture was brought to room temperature under stirring for 3 hours. Subsequently the solvent was evaporated, obtaining the ionic liquid in the form of a crystalline solid, with a yield of 95%.

Example 2: Production of a Supercondenser by Solvent Casting 100 mg of PHB were dissolved in 2 ml of acetic acid (AcOH) by means of agitation for 7 minutes at 110-115° C. 90 µl of 1-butyl-3-methylimidazolium bis(trifluoromethylsulfonyl)imide (BMIM(Tf2N)) were added, and subsequently 40 µmol of TBAF. The solution thus obtained was poured into an aluminium mould and allowed to stand for 15-25 minutes at 105° C., then for 24 hours under vacuum, and then for 30 minutes at 70° C., until complete evaporation of the solvent and obtaining the separator in the form of a membrane having a thickness of about 35-75 µm. The two opposite surfaces of the separator were then placed in contact with electrodes comprising layers of 99.9% pure gold, having a thickness of about 150-200 nm.

Example 3: Production of a Supercondenser by Electrospinning

PHB and BMIM(BF4) were dissolved in HFIP in order to obtain a spinning solution containing PHB and BMIM(BF4) in a weight ratio of 29.2:70.8. The solution was stirred on a heating plate at 800 rpm at a temperature of 25° C. for about 2 hours in order to facilitate the complete dissolution of the polymer.

Subsequently, the solution was cooled at room temperature, poured into a 10 mL plastic syringe and placed inside the electrospinning system in order to be processed. The deposition of the PHB filament on the collector allowed for the creation of the separator in the form of a membrane having a thickness of about 30-100 µm.

The following parameters were used for the electrospinning process
  flow rate of the processed solution: 2-10 ml/hour;
  process temperature: room temperature;
  spindle rotation speed: 200-300 rpm;
  electric field strength: 10-20 KV;
  spinneret-spindle distance: 10-40 cm;
  spindle diameter: 0.3-160 mm.

The two opposite surfaces of the separator were then placed in contact with electrodes comprising layers of 99.9% pure gold, having a thickness of about 150-200 nm.

Example 4: Production of a Supercondenser by Electrospraying

PHB and EMIM(Tf2N) were dissolved in HFIP so as to obtain a spraying solution containing PHB and EMIM (Tf2N) in a weight ratio of 25.6:74.4. The solution was stirred on a heating plate at 800 rpm at a temperature of 25° C. for about 2 hours in order to facilitate the complete dissolution of the polymer.

Subsequently, the solution was cooled at room temperature, poured into a 10 mL plastic syringe and placed inside the electrospraying system in order to be processed. The deposition of the PHB particles on the collector allowed for the creation of the separator in the form of a membrane having a thickness of about 30-100 µm.

The following parameters were used for the electrospraying process
  flow rate of the processed solution: 10 ml/hour;
  process temperature: room temperature;
  spindle rotation speed: 200 rmp;
  electric field strength: 10 KV;
  spinneret-spindle distance: 10 cm;
  spindle diameter: 50 mm.

The two opposite surfaces of the separator were then placed in contact with electrodes comprising layers of 99.9% pure gold, having a thickness of about 150-200 nm.

Example 5: Production of a Supercondenser by Electrospinning and Subsequent Impregnation with Electrolyte The PHB was dissolved in chloroform so as to obtain a spinning solution with a PHB concentration of 6% w/v. The solution was stirred on a heating plate at 800 rpm at a temperature of 25° C. for about 2 hours in order to facilitate the complete dissolution of the polymer.

Subsequently, the solution was cooled at room temperature, poured into a 10 mL plastic syringe and placed inside the electrospinning system in order to be processed. The deposition of the PHB filament on the collector allowed the creation of a PHB membrane having a thickness of about 500-600 µm.

For the creation of the separator, the PHB membrane produced by electrospinning was impregnated with BMIM (Bf4), through immersion in a solution of BMIM(Bf4) at room temperature for about 1-10 seconds.

The two opposite surfaces of the separator were then placed in contact with electrodes comprising layers of 99.9% pure gold, having a thickness of about 150-200 nm.

Example 6: Analysis of the Supercondensers Obtained According to Examples 2-5

The supercondensers produced were tested in order to evaluate the following parameters:
  the maximum operational electric potential and the capacity of the supercondensers upon varying the potential scanning speed (measured by cyclovoltammetry (CV));
  the capacity (C) and equivalent resistance in series (ESR) (measured by electronic impedance spectroscopy (EIS));
  the cyclic charge-discharge process (CCD) at different constant current values to determine the energy density (Wh/kg) and the power density (kW/kg) per weight unit of the electrodes and to calculate the efficiency (measured through Gamry 600+ potentiostat) and determined by the following formulas:

energy (Wh)=$0.5*C*V^2$, power (W)=$(0.25/ESR)*V^2$.

The weight of the electrodes, expressed in Kg, was estimated starting from the density of the gold normalized for porosity, determined by physisorption of gas (BET) measurements multiplied by the deposited volume);

The tables below summarize the results obtained:

TABLE 1

Capacity ($\mu F/cm^2$)

| | Electrolyte | | | | | |
|---|---|---|---|---|---|---|
| | BMIM (BF$_4$) | BMIM (Tf2N) | EMIM (Tf2N) | CHOLINE (Tf2N) | TBAL-PRO | [FurEt2NH] [H$_2$PO$_4$] |
| Solvent casting | 70-428 | 73.3-409 | 104-234 | 123-160 | 100-120 | 155-180 |
| Electrospinning | 158-237 | 183-250 | 229-295 | 220-235 | 175-190 | 210-240 |
| Electrospraying | 158-237 | 183-250 | 229-295 | 180-225 | 130-180 | 210-240 |

TABLE 2

ESR ($\Omega \cdot cm^2$)

| | Electrolyte | | | | | |
|---|---|---|---|---|---|---|
| | BMIM (BF$_4$) | BMIM (Tf2N) | EMIM (Tf2N) | CHOLINE (Tf2N) | TBAL-PRO | [FurEt2NH] [H$_2$PO$_4$] |
| Solvent casting | 300-1000 | 991-89300 | 537-2590 | 3300-13200 | 733-11000 | 500-1000 |
| Electrospinning | 68-700 | 23-2100 | 23-2500 | 19-3300 | 75-2490 | 53-1980 |
| Electrospraying | 68-700 | 23-2100 | 23-2500 | 50-2800 | 70-2700 | 53-1980 |

TABLE 3 power-weight ratio (kW/kg)

| | Electrolyte | | | | | |
|---|---|---|---|---|---|---|
| | BMIM (BF$_4$) | BMIM (Tf2N) | EMIM (Tf2N) | CHOLINE (Tf2N) | TBAL-PRO | [FurEt2NH] [H$_2$PO$_4$] |
| Solvent casting | 0.09-0.3 | 0.56-2.45 | 0.38-3.68 | 0.08-0.39 | 0.08-0.2 | 0.09-0.2 |
| Electrospinning | 1.1-11.9 | 0.04-4.02 | 0.31-40.6 | 0.03-4.87 | 0.04-1.23 | 0.075-2.25 |
| Electrospraying | 1.1-11.9 | 0.04-4.02 | 0.33-40.6 | 0.03-1.85 | 0.03-1.32 | 0.075-2.25 |

TABLE 4 energy-weight ratio (Wh/kg)

| | Electrolyte | | | | | |
|---|---|---|---|---|---|---|
| | BMIM (BF$_4$) | BMIM (Tf2N) | EMIM (Tf2N) | CHOLINE (Tf2N) | TBAL-PRO | [FurEt2NH] [H$_2$PO$_4$] |
| Solvent casting | 0.022-1.03 | 0.02-0.99 | 0.05-0.6 | 0.02-0.3 | 0.04-0.045 | 0.07-0.08 |
| Electrospinning | 0.107-0.71 | 0.08-0.68 | 0.133-0.72 | 0.1-0.13 | 0.3-0.38 | 0.1-0.2 |
| Electrospraying | 0.107-0.71 | 0.08-0.68 | 0.133-0.72 | 0.07-0.11 | 0.1-0.3 | 0.1-0.2 |

The supercondensers currently available on the market have capacities ranging from 500 nF to about 3000 F, with operating voltages that can even reach 160 V for complex systems in industrial-use array-structures, but are typically between 1.4 V and 2.7 V. As regards the energy-weight ratio (Wh/Kg) and the power-weight ratio (W/Kg), the typical values are usually 5 Wh/Kg and 10000 W/Kg, respectively. Typically, the ESR values of commercial devices range from 0.08 mΩ to 10 mΩ.

It should be noted that the measured values in the tables are reported as intervals and not as precise values in order to highlight the variability, from the experimental point of view, of the measured quantities, which is due to various factors including the measurement set-up (electrical contact between measuring instrument and devices) and tolerances on the thickness of the deposited electrodes and on the thickness of the PHB membrane. The indicated intervals represent the two extremes obtained by measuring a representative statistical set of samples manufactured under the same nominal process conditions.

Comparing these values with the results obtained from the tests carried out on the supercondensers of the above examples, it is clear that the supercondensers according to the present disclosure possess capacity, ESR, a power-weight ratio and gravimetric density comparable to those of the supercondensers present on the market, thus proving to be efficient and functional supercondensers.

The invention claimed is:

1. A process for the production of a supercondenser comprising: at least two electrodes separated by at least one separator comprising a polyhydroxyalkanoate (PHA) and at least one electrolyte, the process including the following steps:
   providing at least two electrodes,
   providing at least one separator comprising a polyhydroxyalkanoate (PHA) and an electrolyte, and
   placing each electrode in contact with a corresponding surface of the separator;
      wherein the step of providing at least one separator comprises combining the PHA with the electrolyte by solvent casting,
      wherein the solvent casting comprises the steps of:
   dissolving the PHA in a solvent, preferably selected from: HFIP, chloroform, N,N-dimethylformamide, dichloromethane, dichloroethane, aniline and acetic acid,
   adding to the solution thus obtained an electrolyte, preferably an ionic liquid, and
   pouring the solution added with electrolyte into a mould and allowing it to stand until the solvent evaporates.

2. The process according to claim 1, wherein the at least one separator comprises from 10% to 90% by weight of PHA, and from 10% to 90% by weight of electrolyte, the percentages being expressed with respect to the weight of the separator.

3. The process according to claim 1, wherein the at least one electrolyte is an ionic liquid, selected from: derivatives of natural amino acids, natural derivatives of lignin, ionic liquids of synthetic origin.

4. The process according to claim 3, wherein the at least one electrolyte is selected from: tetrabutylammonium L-proline (TBA L-Pro), choline bis(trifluoromethylsulfonyl)imide (choline(Tf2N)), tetraethylammonium L-proline (TEA L-Pro); phosphoric acid of N-ethyl-N-(furan-2-yl-methyl) ethanamine ([FurEt2NH][$H_2PO_4$]), phosphoric acid of N-ethyl-N-(4-methoxybenzyl)ethanamine ([p-AnisEt2NH][$H_2PO_4$]), phosphoric acid of N-4-((diethylamino)methyl)-2-methoxyphenol ([VanEt2NH] [$H_2PO_4$]); 1-butyl-3-methylimidazolium tetrafluoroborate (BMIM(BF4)), 1-butyl-3-methylimidazolium bis(trifluoromethylsulfonyl)imide (BMIM(Tf2N)), 1-ethyl-3-methylimidazolium bis(trifluoromethylsulfonyl)imide (EMIM(Tf2N)).

5. The process according to claim 1, wherein said solution added with electrolyte comprises PHA in a concentration comprised between 3% and 20% by weight, the electrolyte in a concentration comprised between 1% and 20% by weight, the percentages being expressed with respect to the weight of the solution.

6. A process for the production of a supercondenser comprising: at least two electrodes separated by at least one separator comprising a polyhydroxyalkanoate (PHA) and at least one electrolyte, the process the following steps:
   providing at least two electrodes,
   providing at least one separator comprising a polyhydroxyalkanoate (PHA) and an electrolyte, and
   placing each electrode in contact with a corresponding surface of the separator;
      wherein the step of providing at least one separator comprises combining the PHA with the electrolyte by electrospinning,
      wherein the electrospinning comprises the following steps:
   preparing a spinning solution by means of solubilizing the polyhydroxyalkanoate (PHA), preferably PHB, and of the at least one electrolyte, preferably an ionic liquid, in a solvent, preferably selected from: HFIP, chloroform, N,N-dimethylformamide, dichloromethane, dichloroethane, aniline, acetic acid,
   subjecting the spinning solution to an electrospinning process, thus obtaining PHA fibres, and
   depositing the PHA fibres on a collector, so as to obtain a separator.

7. The process according to claim 6, wherein the spinning solution comprises PHA in a concentration comprised between 4% and 10% by weight, the electrolyte in a concentration comprised between 1% and 25% by weight, the percentages being expressed with respect to the weight of the solution.

8. The process according to claim 6, wherein the at least one separator comprises from 10% to 90% by weight of PHA, and from 10% to 90% by weight of electrolyte, the percentages being expressed with respect to the weight of the separator.

9. The process according to claim 6, wherein the at least one electrolyte is an ionic liquid, selected from: derivatives of natural amino acids, natural derivatives of lignin, ionic liquids of synthetic origin.

10. The process according to claim 9, wherein the at least one electrolyte is selected from: tetrabutylammonium L-proline (TBA L-Pro), choline bis(trifluoromethylsulfonyl)imide (choline(Tf2N)), tetraethylammonium L-proline (TEA L-Pro); phosphoric acid of N-ethyl-N-(furan-2-yl-methyl) ethanamine ([FurEt2NH][$H_2PO_4$]), phosphoric acid of N-ethyl-N-(4-methoxybenzyl)ethanamine ([p-AnisEt2NH][$H_2PO_4$]), phosphoric acid of N-4-((diethylamino)methyl)-2-methoxyphenol ([VanEt2NH] [$H_2PO_4$]); 1-butyl-3-methylimidazolium tetrafluoroborate (BMIM(BF4)), 1-butyl-3-methylimidazolium bis(trifluoromethylsulfonyl)imide (BMIM(Tf2N)), 1-ethyl-3-methylimidazolium bis(trifluoromethylsulfonyl)imide (EMIM(Tf2N)).

11. A process for the production of a supercondenser comprising: at least two electrodes separated by at least one separator comprising a polyhydroxyalkanoate (PHA) and at least one electrolyte, the process including the following steps:
providing at least two electrodes,
providing at least one separator comprising a polyhydroxyalkanoate (PHA) and an electrolyte, and
placing each electrode in contact with a corresponding surface of the separator;
wherein the step of providing at least one separator comprises combining the PHA with the electrolyte by electrospraying
wherein the electrospraying comprises the following steps:
preparing a spraying solution by means of solubilizing the polyhydroxyalkanoate (PHA), preferably PHB, and the at least one electrolyte, preferably an ionic liquid, in a solvent, preferably selected from: HFIP, chloroform, dichloromethane, dichloroethane, aniline, acetic acid,
subjecting the spraying solution to an electrospraying process, thus obtaining PHA particles, and
depositing the PHA particles on a collector, so as to obtain a separator.

12. The process according to claim 11, wherein said spraying solution comprises PHA in a concentration comprised between 4% and 10% by weight, the electrolyte in a concentration comprised between 1% and 25% by weight, the percentages being expressed with respect to the weight of the solution.

13. The process according to claim 11, wherein the at least one separator comprises from 10% to 90% by weight of PHA, and from 10% to 90% by weight of electrolyte, the percentages being expressed with respect to the weight of the separator.

14. The process according to claim 11, wherein the at least one electrolyte is an ionic liquid, selected from: derivatives of natural amino acids, natural derivatives of lignin, ionic liquids of synthetic origin.

15. The process according to claim 14, wherein the at least one electrolyte is selected from: tetrabutylammonium L-proline (TBA L-Pro), choline bis(trifluoromethylsulfonyl)imide (choline(Tf2N)), tetraethylammonium L-proline (TEA L-Pro); phosphoric acid of N-ethyl-N-(furan-2-yl-methyl) ethanamine ([FurEt2NH][H$_2$PO$_4$]), phosphoric acid of N-ethyl-N-(4-methoxybenzyl)ethanamine ([p-AnisEt2NH][H$_2$PO$_4$]), phosphoric acid of N-4-((diethylamino)methyl)-2-methoxyphenol ([VanEt2NH] [H$_2$PO$_4$]); 1-butyl-3-methylimidazolium tetrafluoroborate (BMIM(BF4)), 1-butyl-3-methylimidazolium bis(trifluoromethylsulfonyl)imide (BMIM(Tf2N)), 1-ethyl-3-methylimidazolium bis(trifluoromethylsulfonyl)imide (EMIM(Tf2N)).

16. A process for the production of a supercondenser comprising: at least two electrodes separated by at least one separator comprising a polyhydroxyalkanoate (PHA) and at least one electrolyte, the process including the following steps:
providing at least two electrodes,
providing at least one separator comprising a polyhydroxyalkanoate (PHA) and an electrolyte, and
placing each electrode in contact with a corresponding surface of the separator;
wherein the step of providing at least one separator comprises the following steps:
preparing a spinning solution comprising PHA and a solvent selected from: HFIP, chloroform, dichloromethane, dichloroethane, aniline, acetic acid;
subjecting the spinning solution to an electrospinning process, thus obtaining PHA fibres;
depositing the PHA fibres on a collector, so as to obtain a separator; and
impregnating the separator with at least one electrolyte, preferably an ionic liquid.

17. The process according to claim 16, wherein the at least one separator comprises from 10% to 90% by weight of PHA, and from 10% to 90% by weight of electrolyte, the percentages being expressed with respect to the weight of the separator.

18. The process according to claim 16, wherein the at least one electrolyte is an ionic liquid, selected from: derivatives of natural amino acids, natural derivatives of lignin, ionic liquids of synthetic origin.

19. The process according to claim 18, wherein the at least one electrolyte is selected from: tetrabutylammonium L-proline (TBA L-Pro), choline bis(trifluoromethylsulfonyl)imide (choline(Tf2N)), tetraethylammonium L-proline (TEA L-Pro); phosphoric acid of N-ethyl-N-(furan-2-yl-methyl) ethanamine ([FurEt2NH][H$_2$PO$_4$]), phosphoric acid of N-ethyl-N-(4-methoxybenzyl)ethanamine ([p-AnisEt2NH][H$_2$PO$_4$]), phosphoric acid of N-4-((diethylamino)methyl)-2-methoxyphenol ([VanEt2NH] [H$_2$PO$_4$]); 1-butyl-3-methylimidazolium tetrafluoroborate (BMIM(BF4)), 1-butyl-3-methylimidazolium bis(trifluoromethylsulfonyl)imide (BMIM(Tf2N)), 1-ethyl-3-methylimidazolium bis(trifluoromethylsulfonyl)imide (EMIM(Tf2N)).

\* \* \* \* \*